United States Patent

[11] 3,589,237

| [72] | Inventors | Manfred Strohecker<br>Hatboro;<br>Herman C. Voellm, Jr., Meadowbrook, both of, Pa. |
|---|---|---|
| [21] | Appl. No. | 846,097 |
| [22] | Filed | July 30, 1969 |
| [45] | Patented | June 29, 1971 |
| [73] | Assignee | Volstro Manufacturing Company<br>Philadelphia, Pa. |

[54] DOUBLE CROSS-SLIDE MILLING ATTACHMENT
4 Claims, 9 Drawing Figs.

[52] U.S. Cl. .................................................. 90/15,
279/6, 90/16
[51] Int. Cl. .................................................. B23c 1/12,
B23c 7/00
[50] Field of Search .................................. 90/15,
15.15, 15.2, 175, 16, 17; 279/6

[56] References Cited
UNITED STATES PATENTS

| 2,610,550 | 9/1952 | Touchman .................. | 90/16 X |
| 3,014,391 | 12/1961 | Fuhrman ..................... | 279/6 X |
| 3,249,017 | 5/1966 | Strohecker et al............ | 90/15 |

Primary Examiner—Gill Weidenfeld
Attorney—Seidel and Gonda

ABSTRACT: A milling attachment is disclosed for use with milling machines having a support and a rotary drive spindle associated with the support. The attachment includes a member adapted to be coupled to the support for rotation about an axis defined by the drive spindle, a first cross-slide member slidably coupled to the rotatable member for sliding movement in a direction perpendicular to the axis of the drive spindle, and a second cross-slide member coupled to the first cross-slide member for sliding in a direction perpendicular to the axis of the drive spindle and the direction of sliding motion of the first cross-slide member. A drive spindle for a cutter is coupled to the second cross-slide member.

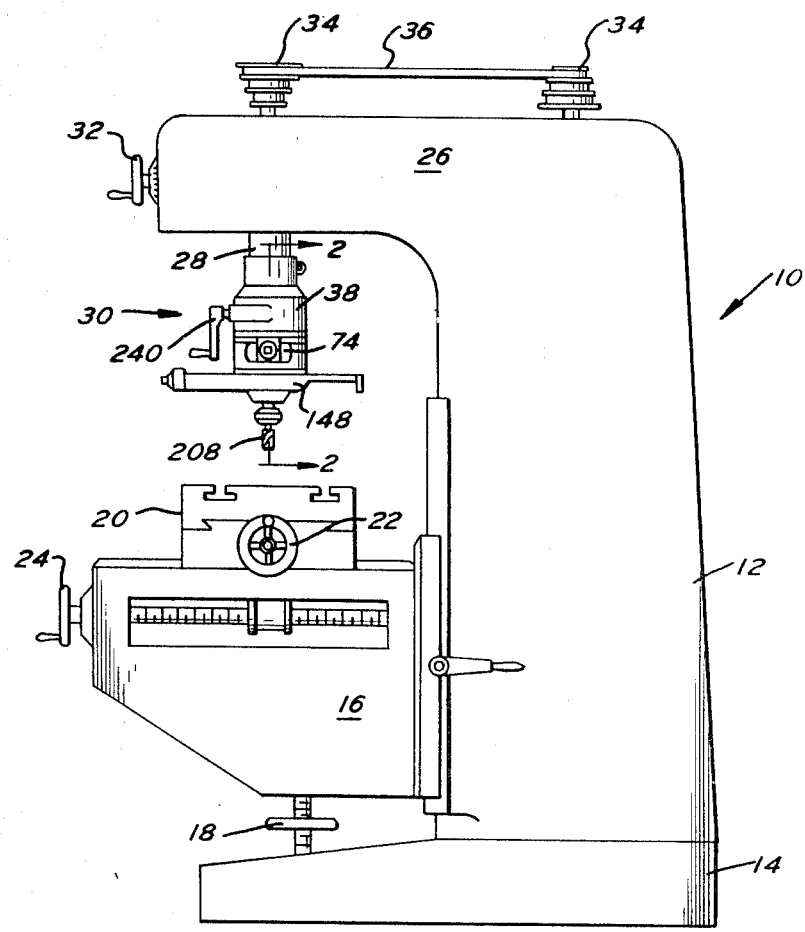
FIG.1
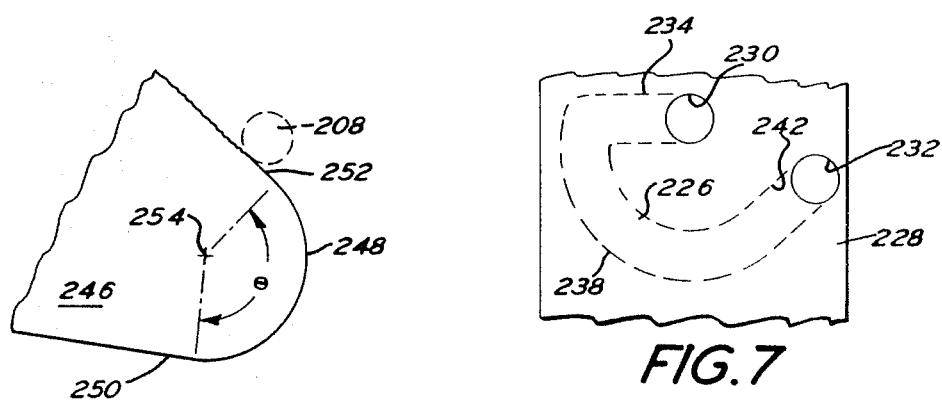
FIG.8
FIG.7
INVENTORS.
MANFRED E. STROHECKER
HERMAN C. VOELLM, JR.
BY
Seidel, Gonda & Goldhammer
ATTORNEYS

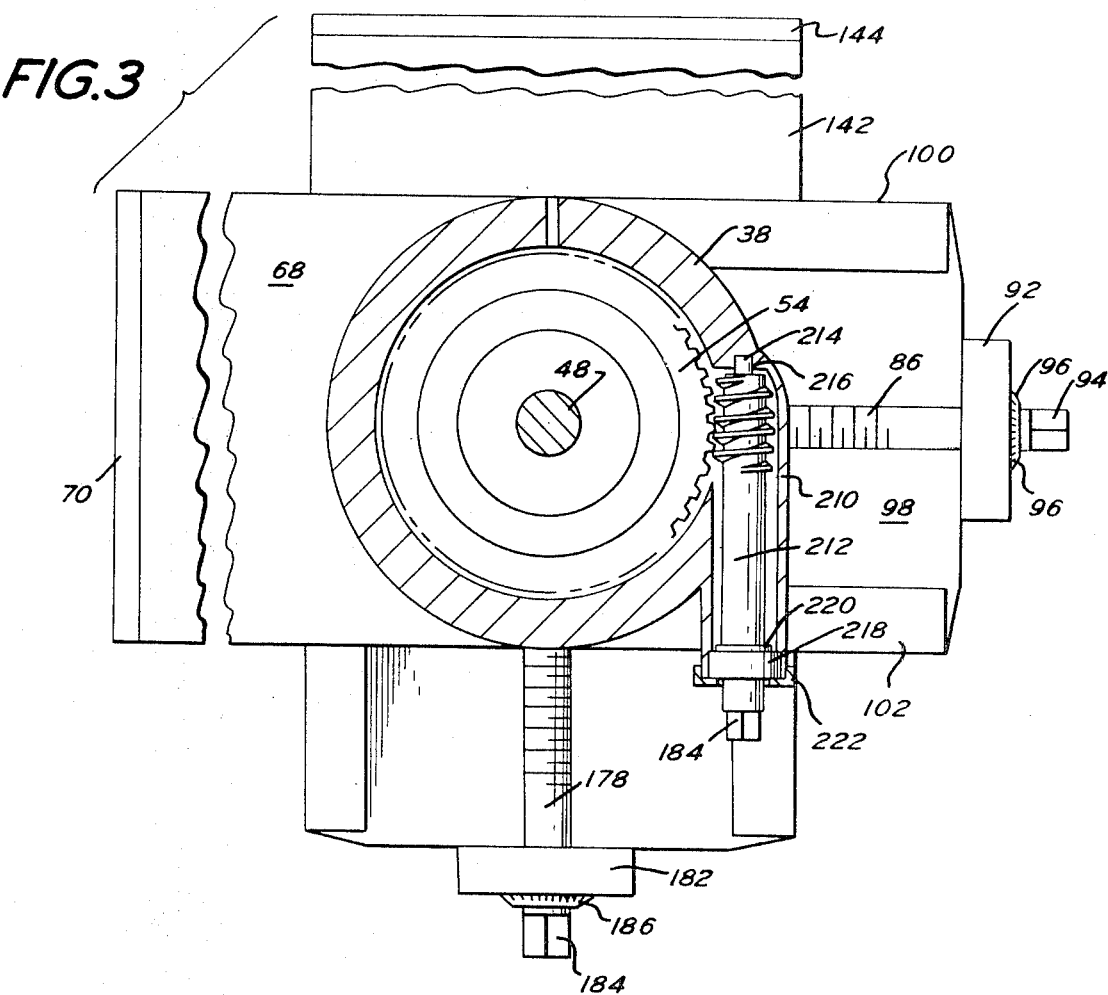
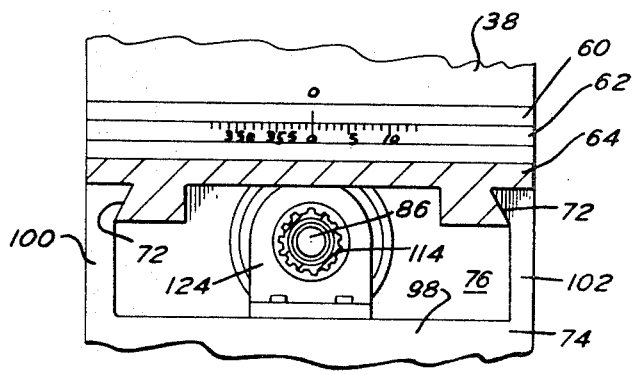

DOUBLE CROSS-SLIDE MILLING ATTACHMENT

This invention relates to milling apparatus, and more particularly, to a double cross-slide milling head attachment whereby a rotary cutter may be moved with respect to an axially fixed drive spindle to positions radially and circumferentially spaced from the drive spindle, and to positions on lines tangent to circumferential paths about the spindle.

The present milling head attachment is adapted to be used in conjunction with a wide variety of existing milling machines for performing intricate milling operations. The milling head attachment of the present invention enables a standard milling machine to accomplish intricate milling operations by providing selective motion of the milling cutter in selected directions and arcs.

Milling head attachments capable of providing selective movement of the milling cutter have heretofore been proposed. For example, the apparatus shown in U.S. Pat. Nos. 3,153,369 and 3,249,017, issued to the inventors of the present application, and assigned to the assignee of the present application, provide for selective movement of the cutter radially with respect to the axis of a drive spindle, and circumferentially with respect to the spindle through an arc of 360° F. The apparatus disclosed in these patents has proved eminently useful, and enjoyed considerable commercial success. The milling head attachment of the present invention provides a pair of cross-slides, disposed at right angles to each other. Operations not easily performed with previous apparatus are readily accomplished with the present attachment.

A drive spindle for the rotary cutter is slidably mounted on the lower of the slides, thus providing for translation of the cutter in directions transverse to the upper slide. The pair of cross-slides of the present invention makes it possible to mill tangentially with respect to any point on a circular arc of a given radius about the drive spindle of a milling machine. Moreover, the present apparatus makes it possible to mill, in a single setup, an arc of a given radius, a tangent to that radius, and an arc of a second radius. Such operations have heretofore required the use of heavy and complex milling tables having cross-slides.

Another feature of the present milling head attachment is the capability of providing a greater "offset" of the milling cutter from the spindle of the milling machine, due to the travel obtainable through the use of the second slide.

It is an object of the present invention to provide a novel milling head attachment adapted to be utilized in a milling machine.

It is another object to provide a novel milling head attachment which provides the capability for radial and circumferential milling, and for milling tangents to circular arcs of a given radius, all in a single setup.

It is yet another object of the present invention to provide a novel milling head attachment adapted to be used with a wide variety of standard milling machines.

It is a further object of the present invention to provide a novel milling head attachment capable of providing greater offsets than are obtainable with prior art attachments.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is an elevation view of a milling machine, with which a milling head attachment in accordance with the present invention is associated.

FIG. 3 is a cross-sectional view taken along the line 3-3 in FIG. 2.

FIG. 4 is a cross-sectional view taken along the line 4-4 in FIG. 2.

FIG. 7 is a plan view of a workpiece illustrating the manner in which it may be machined, using the apparatus of the present invention.

FIG. 8 is a diagrammatic view illustrating one type of cut which may be made with the present invention.

Figure 2:
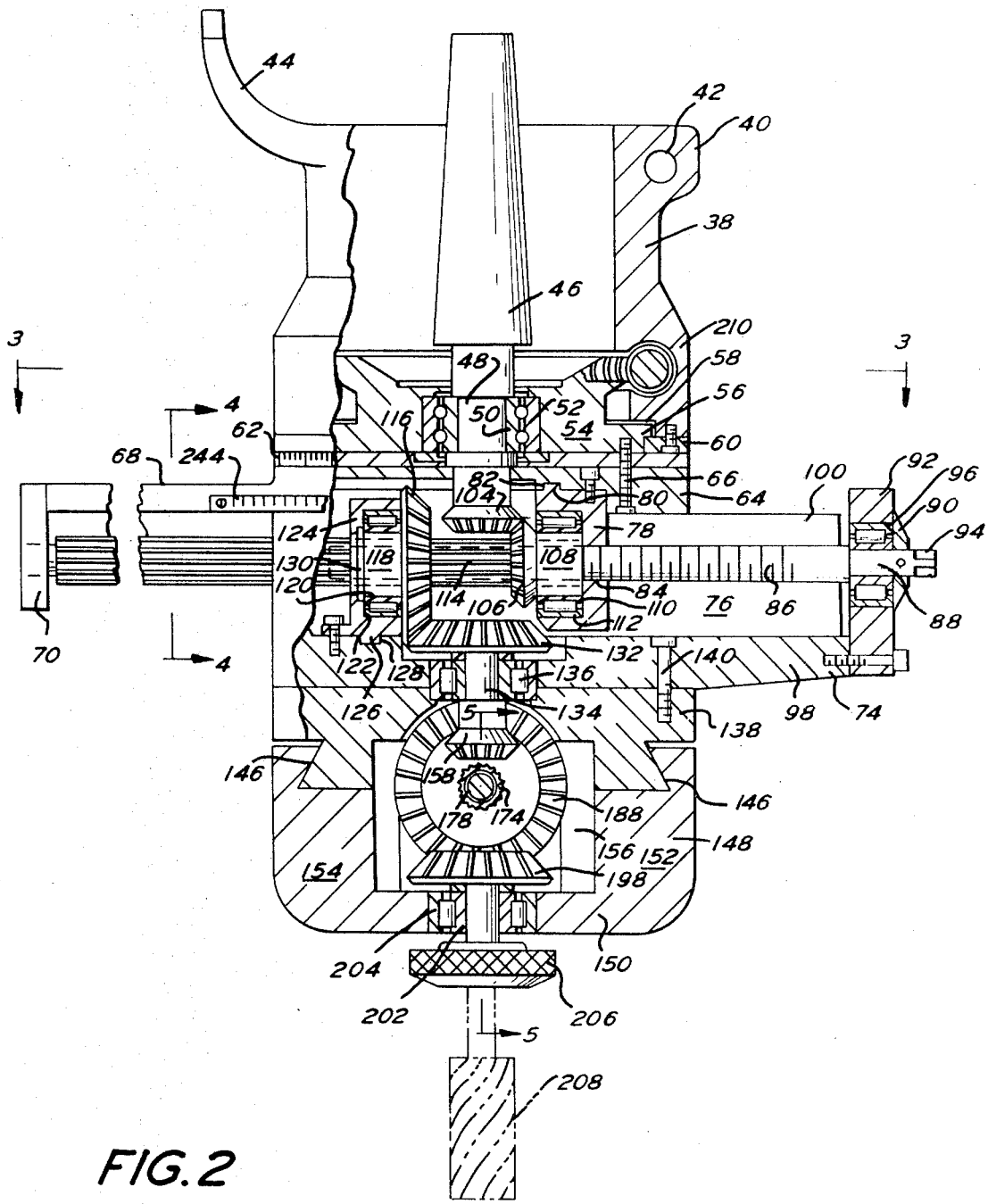
FIG. 2 is an elevation view, partly in section, of a milling head attachment in accordance with the present invention.

Referring now to the drawings in detail, wherein like numerals indicate like elements, there is seen in FIG. 1 a milling apparatus designated generally by the reference numeral 10. The apparatus 10 includes an upwardly extending column 12, coupled to a base 14. A knee 16 is slidably coupled to the column 12. Adjustable means 18 are provided to position the knee 16. The knee 16 has a work support 20 adjustably mounted thereon for movement in two mutually perpendicular directions. The movement of the work support 20 may be accomplished by rotating handles 22 and 24.

An overarm support 26 extends from an upper end of the column 12. A quill or sleeve 28 extends downwardly from the overarm support 26.

The milling head attachment of the present invention is designated generally by the reference numeral 30. The milling head attachment 30 is removably supported in depending relation from the quill or sleeve 28. Movement of the attachment 30 toward and away from the work support 20 may be accomplished by means of a rotatable handle 32, coupled to the sleeve 28. Any conventional means may be used to effect movement of the attachment 30 toward and away from the work support 20.

A motor, not shown, is disposed within the column 12, and connected to a drive shaft disposed in an upright position within the overarm support 26 by means of cone pulleys 34 and a drive belt 36.

Referring now to FIG. 2, the attachment 30 includes a hollow casing 38, adapted to be removably coupled to the sleeve 28. An upper portion of the casing 38 may take the form of a split sleeve having ears 40 thereon, adapted to receive a clamping bolt, not shown, through openings 42 therein. In such an embodiment, tightening of the bolt draws opposite sides of the split sleeve inwardly toward each other to securely clamp the outer periphery of the sleeve 28. A stabilizer arm 44 may be secured to the casing 38 to provide a further attachment point between the attachment 30 and sleeve 28.

An upright drive spindle 46 is disposed within the casing 38, and extends beyond the upper end of the casing 38 for selective engagement with the drive spindle, not shown, of the milling apparatus 10. The lower end of the drive spindle 46 is provided with a reduced diameter portion 48, fitted within the inner race 50 of a dual ball bearing. The outer race 52 of the bearing is fitted within a ring gear 54.

The ring gear 54 is provided with a radially outwardly directed angular flange 56. The flange 56 is secured in sliding contact with a shoulder 58 within the casing 38 by means of a ring member 60. The inner diameter of the ring member 60 is less than the outer diameter of the flange 56. The ring member 60 is removably secured to a lower edge of the casing 38 by means of a plurality of threaded fasteners, not numbered, disposed at spaced points about the periphery of the ring member 60.

A calibrated ring 62 is juxtaposed to the lower surface of ring gear 54. An annular support member 64 is juxtaposed to the lower surface of the ring 62. A plurality of spaced threaded fasteners 66 removably secure the support member 64 and scale 62 to the ring gear 54. The support member 64 includes an integral arm 68 extending in a radial direction, to the left in FIG. 1. The arm 68 terminates in a downwardly extending flange 70. As is perhaps best seen in FIG. 4, the arm 68 provides angularly disposed guide surfaces 72.

A first cross-slide head 74 is slidably disposed on the guide surfaces 72. Referring to FIG. 4, the first cross-slide head 74 is provided with a hollow interior portion 76, for a purpose which will be apparent later.

A mounting block 78 depends from support member 64. The mounting block 78 is coupled to the support member 64 by means of threaded fasteners, not numbered, best seen in FIG. 2. The mounting block 78 is preferably provided with a rib 80, normally engaging a complemental groove 82 in the support member 64. The rib 80 and groove 82 serve to positively position the mounting block 78, and resist thrust on the mounting block 78.

The mounting block 78 is provided with a threaded axial bore 84. A threaded rod 86 is threadedly engaged in the bore 84. An end portion 88 of the threaded rod 86 is rotatably received in a bearing 90. The bearing 90 is mounted within an upright support plate 92, forming an extension of the first cross-slide head 74. Flats 94, or other equivalent means, may be provided on an end of the threaded rod 86 to facilitate rotation of the rod.

A calibrated dial 96 is associated with the end portion 88, and rotates therewith. The calibrated dial 96 cooperates with a zero marking, not shown, on the support plate 92.

The previously mentioned hollow interior portion 76 of the first cross-slide head 74 is defined by a base 98 and spaced upright sidewalls 100 and 102, as is perhaps best seen in FIG. 4.

Referring again to FIG. 2, there is seen a bevel gear 104 coupled to an end of the drive spindle 46. In engagement with the bevel gear 104 is a second bevel gear 106. The gears 104 and 106 are in mutually perpendicular planes. The bevel gear 106 is coupled to a hollow shaft 108, in engagement with an inner race 110 of a roller bearing. The outer race 112 of the bearing is force fitted in the mounting block 78. Thus, rotation of the drive spindle 46 results in a corresponding rotation of the shaft 108 to which the bevel gear 106 is affixed. Coupled to the gear 106 and its shaft 108 is an externally splined tube 114. A distal end of the tube 114 is journaled in the flange 70 depending from the arm 68.

An internally splined bevel gear 116 rides on the splines of the tube 114. Thus, the bevel gear 116 is adapted to rotate with the tube 114. The gear 116 is coupled to an axially extending tubular shaft 118. One end of the shaft 118 is received in an inner race 120 of a bearing, the outer race 122 of such bearing being force fitted within a mounting block 124. The mounting block is coupled to the first cross-slide head 74 by removable fasteners, not numbered. Also, a transverse rib 126 and groove 128, similar to the rib and groove 80 and 82, may be provided to interconnect the mounting block 124 and cross-slide head 74. A retaining ring 130 in the mounting block 124 abuts an end of the shaft 118.

The bevel gear 116 is in meshing engagement with another bevel gear 132. The bevel gear 132 is secured to a stub shaft 134, rotatably mounted by means of a bearing 136 partially received in the cross-slide head 74. In the "zero" position of the cross-slide head 74, the stub shaft 134 is in axial alignment with the drive spindle 46.

Figures 5, 6, 9:
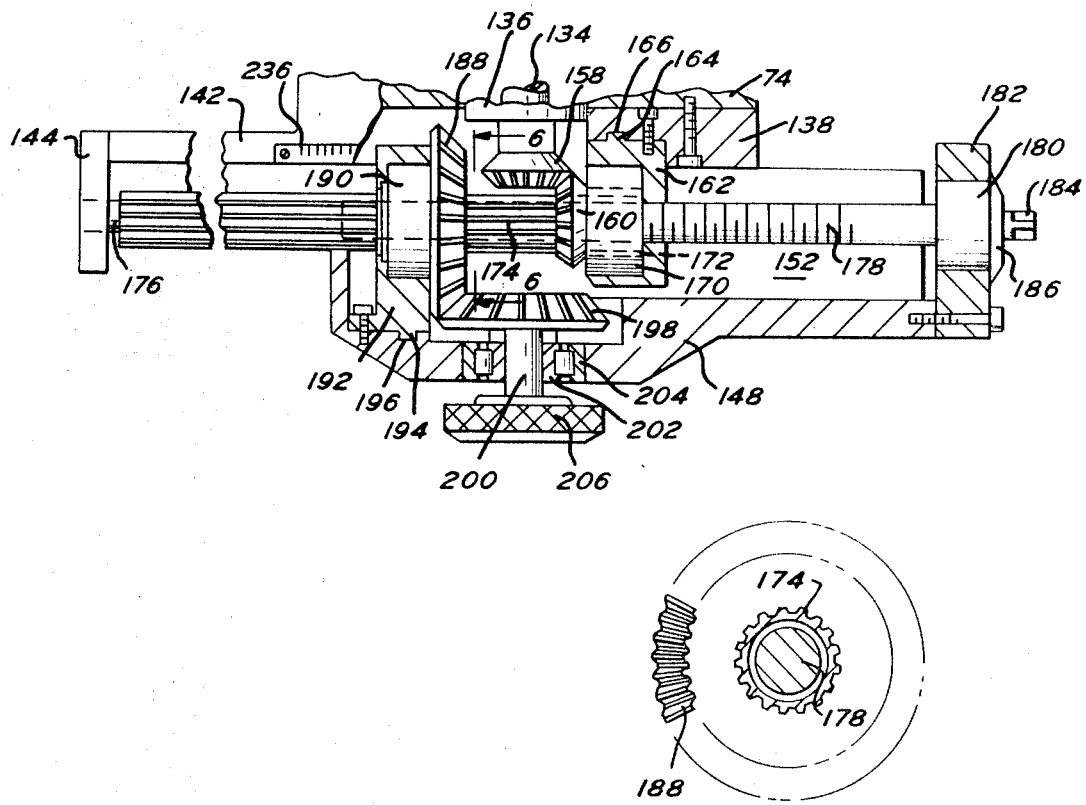
FIG. 5 is a cross-sectional view taken along the line 5-5 in FIG. 2.
FIG. 6 is an enlarged sectional view taken along the line 6-6 in FIG. 5.
FIG. 9 is a diagrammatic view illustrating another type of cut which may be made with the present invention.

A support member 138 is fastened, for example by threaded fasteners 140, to the underside of the first cross-slide head 74. Referring to FIG. 5, the support member 138 provides an arm 142, extending to the left in the figure. A depending flange 144, similar to the above-described depending flange 70, is provided on an end of the arm 142.

Referring again to FIG. 2, the support member 138 includes angled guide surfaces 146, extending in a direction perpendicular to the axial direction of the stub shaft 134 and drive spindle 46, and at right angles to the direction of the guide surfaces 72 of the support member 64.

A second cross-slide head 148 is provided in sliding engagement with the guide surfaces 146. The second cross-slide head 148 includes a base 150 and spaced upwardly extending sidewalls 152 and 154. Base 150 and sidewalls 152, 154 define a hollow interior portion 156.

In the illustrated embodiment, the bearing 136 is partially received in an upper portion of the support member 38. Thus, the bearing 136 serves as a convenient guide for aligning the support member 138 and cross slide head 74 during assembly.

A bevel gear 158 is coupled to an end of the stub shaft 134 for rotation therewith. As is best seen in FIG. 5, the bevel gear 158 is in meshing interengagement with another bevel gear 160. The bevel gears 158 and 160 are in mutually perpendicular planes. A mounting block 162 is coupled to the support member 138 in a manner similar to the coupling of the mounting block 78 to the support member 64. Thus, a threaded fastener, not numbered, may be employed, along with a rib 164 and groove 166.

The bevel gear 160 is rotatably supported in the mounting block 162 by means of a bearing 170. The bearing 170 receives a tubular shaft 172, seen only in dotted line in FIG. 5, coupled to the bevel gear 160. Also coupled to the bevel gear 160, and adapted to rotate therewith, is an externally splined tube 174. One end of the tube 174 is journaled, as at 176, in the flange 144. A threaded rod 178 threadedly engages an opening in the mounting block 162, and extends through the tubular shaft 172 to which the bevel gear 160 is attached into the hollow interior of the tube 174. The threaded rod 178 is not, however, in direct contact with the tube 174, as is apparent from FIG. 6. One end of the threaded rod 178 is journaled, as for example by means of a bearing 180, in an upstanding support plate 182, coupled to the second cross-slide head 148. Flats 184 may be provided on an end of the threaded rod 178 to facilitate its selective rotation. Also, a calibrated dial 186, similar to the dial 96, may be provided in conjunction with the support plate 182.

Riding on the tube 174 in contact with its external spline is an internally splined bevel gear 188. The gear 188 is preferably coupled to a hollow tubular shaft, not shown. Such shaft, it should be understood, is generally similar to the previously described shaft 118. The tubular shaft to which the gear 188 is coupled is preferably received in a bearing 190. The bearing 190, in turn, is fitted into a recess in a mounting block 192. The mounting block 192 is coupled by means of a fastener, not numbered, and mating rib 194 and groove 196, to the base 150 of the lower cross-slide head 148.

In meshing engagement with the bevel gear 188 is a bevel gear 198. The gears 188 and 198 are in mutually perpendicular planes. The bevel gear 198 is coupled to a shaft 200, whose axis, when the second cross-slide head 148 is in a "zero" position, is aligned with the stub shaft 134. In the illustrated embodiment, the shaft 200 is received in the inner race 202 of a roller bearing, the outer race 204 of which is associated with the cross-slide head 148. Other bearing arrangements could be of course used. The lowermost end of the shaft 200 receives a collet, which removably receives milling cutters, such as the milling cutter 208 seen in phantom in FIG. 2. A wide variety of milling cutters may of course be utilized in the milling head attachment of the present invention.

Referring now to FIGS. 2 and 3, there is seen a means whereby the support member 64, first cross-slide head 74, support member 138, and second cross-slide head 148 may be selectively rotated as a unit with respect to the casing 38. The casing 38 is provided with a hollow tangential boss 210 in communication therewith. The boss 210 is perhaps best seen in FIG. 3. Rotatably mounted in the boss 210 is a worm screw 212. The worm screw 212 is in meshing engagement with the previously described ring gear 54. In the illustrated embodiment, one end of the worm screw 212 is provided with a reduced diameter axial projection 214, adapted to be received in a blind opening 216 in a wall of the casing 38. The other end of the worm screw 212 is rotatably supported by a bearing 218. The bearing 218 also cooperates with an abutment, such as a snapring 220 on the worm screw 212, to maintain the worm screw 212 in proper axial alignment for engagement with the ring gear 54. A threaded cap 222, engageable with complemental threads on the free end of the boss 210 serves to retain the bearing 218 in place. Flats 224 may be provided on an exposed end of the worm screw 212 to facilitate its selective rotation. Rotation of the worm screw 212 causes rotation of the ring gear 54 and the support member 64 fixed thereto about an axis corresponding to the axis of the drive spindle 46.

Thus, rotation of the worm screw 212 causes rotation of the entire lower structure of milling head attachment 30, including first cross-slide head 74, second cross-slide head 148, collet 206 and milling cutter 208 about a central axis defined by the axis of the drive spindle 46.

The manner in which the above-described milling head attachment 30 can be used to mill complex shapes will now be described in detail.

Referring to FIG. 7, there is seen in dotted line a slot 226, which may be a fluid transfer passage or the like, in a workpiece 228. The workpiece 228 includes holes 230 and 232, forming ports to be interconnected. Assuming the cutter 208 to be centered coaxially with the hole 230, an initial linear cut 234 can be made by progressively adjusting the offset of the cutter 208 from its "zero" axis by adjustment of the cross-slide head 148. Referring to FIG. 5, this is accomplished by rotating the threaded rod 178. Rotation of the threaded rod 178 in the threads of the mounting block 162 causes its translation, and consequently, translation of the cross-slide head 148, with respect to the mounting block 162. It will be seen that translation of the cross-slide head 148 from its "zero" position does not interrupt drive to the collet 206. Thus, translation of the cross-slide head 148 does not interrupt the driving interengagement of bevel gears 158 and 160. The bevel gear 160 drives the tube 174. The bevel gear 188, which does move with the cross-slide head 148, is in driving engagement with the external splines of the tube 174, and also with the bevel gear 198. Thus, regardless of the offset position of cross-slide head 148, drive is transmitted through bevel gears 158 and 160, the tube 174, the bevel gear 188, the bevel gear 198 and the shaft 200 to the collet 206.

Rotation of the threaded rod 178 may be accomplished by the use of a handle or wrench adapted to mate with the flats 184, or by means of power drive means, as might occur to those of ordinary skill in the art.

Referring again to FIG. 5, the length of the linear cut 234 may be determined by reference to a graduated scale 236 coupled to the support member 138 and flange 142.

After completion of the linear cut 234, an arcuate cut 238 may be made by rotating the worm screw 212 to cause rotation of the ring gear 54, and the parts of the attachment 30 suspended therefrom. Such rotation moves the cutter in an arcuate path having a radius equal to the length of the linear cut 234. Rotation of the worm screw 212 may be accomplished manually, by the handle 240 seen in FIG. 1, or by means of automatic drive apparatus of the type set forth in U.S. Pat. No. 3,249,017.

Next, a cut 242 tangent to the arcuate cut 238 may be made by adjusting the offset of the first cross-slide head 74 from its "zero" position. This may be accomplished by rotation of the threaded rod 86. Operation of the threaded rod 86 to cause offset of the cross-slide head 74 is in all respects similar to the procedure described above in connection with the cross-slide head 148. Rotation of the drive spindle 46 is transmitted through the bevel gears 104 and 106 to the tube 114. Drive is then transmitted through the splines of the tube 114 to the bevel gear 116 and from the bevel gear 116 to the bevel gear 132. The bevel gear 132 drives the stub shaft 134, and the previously mentioned bevel gear 158. Thus, the adjustment of the first cross-slide head 74 does not interrupt drive to the cutter 208. The length of the tangential cut 242 may be determined by reference to a graduated scale 244 applied to the support member 64 and arm 68, or the dial 96.

Referring now to FIG. 8, there is illustrated the manner in which the present milling head attachment 30 may be used, in conjunction with a work support providing movement in only one direction, to mill in one setup a portion of a workpiece 246 having an arcuate corner portion 248 and linear side portions 250 and 252. The initial setup is made with the side portion 252 aligned with the direction of movement provided by the work support. Initially, the drive spindle 46 of the milling apparatus 10 is aligned over the center 254 of the arc defining the corner portion 248. Either of the cross-slide heads 74 and 148 may be used to provide offset sufficient to space the periphery of the cutter 208 from the center 254 by a distance equal to the radius of the corner portion 248. The corner portion 248 may be milled by rotating the worm screw 212 and ring gear 54 sufficiently to provide the desired arc for the corner portion 248. Travel of the other cross-slide heads 74 or 148 permits milling of the side portion 250. After completion of the side portion 250 and corner portion 248, the side portion 252 may be milled by moving the workpiece 246 with its support relative to the cutter 208.

Referring to FIG. 9, there is seen an exemplary workpiece 246 containing an irregular slot 258. The profile of the slot 258 comprises a first arcuate portion 260; a first linear element 262 tangent to the arcuate portion 260; a second arcuate portion 264 intersecting the first linear element; and a second linear element 266 interconnecting the first and second arcuate portions 260, 264. The slot 158 may be made in a single setup, using the present milling head attachment 30 and work support providing movement in only a single direction, in the following manner.

The workpiece 246 is mounted on the support with the intended direction of the second linear element 266 parallel to the direction of movement provided by the support. The axis of the drive spindle 46 is located over the center 268 of the arcuate portions 260 and 264. One of the cross slide heads 74, 148 is offset to provide the radius of the arcuate portion 260. Rotation of the worm screw 212 and ring gear 54 thus causes the cutter 208 to describe the first arcuate portion 260. After swinging of the arc 260, the other cross-slide head may be used to cause the cutter 208 to traverse the first linear element 262. When the first linear element 262 has reached the desired length, as indicated by one or the other of the graduated scales 236, 244, rotation of the worm screw 212 and ring gear 54 may be initiated to cut the second arcuate portion 264. When the desired angular arc for the second arcuate portion has been completed, linear motion of the work support feeds the workpiece 246 for cutting of the second linear element 266.

Thus, it will be seen that the attachment 30 of the present invention provides a simple, yet effective means for making intricate milling cuts, often in a single setup. Moreover, the attachment is adapted for use with existing milling machines, thus

We claim:

1. For use with milling apparatus comprising a support having a rotary drive member, a milling attachment whereby a cutter may be moved, selectively, to positions wherein it is radially and circumferentially offset from the axis of rotation of the drive member and to positions on paths tangent to circumferential paths about the axis of rotation of the drive member, said attachment comprising rotatable means adapted to be coupled to said support for rotation coaxially with the axis of the drive member, a first cross-slide member coupled to said rotatable means for movement in a direction perpendicular to the axis of rotation of the drive member, a second cross-slide member coupled to said first cross-slide member for movement in a direction perpendicular to the axis of rotation of the drive spindle member and the direction of movement of said first crossmember, means coupled to said second cross-slide member for rotatably supporting a cutter therefrom, and drive transmitting means coupling said means for supporting a cutter to the drive member.

2. Apparatus in accordance with claim 1 wherein said attachment comprises a housing adapted to be removably secured to the support, and a support member coupled to said housing for rotation coaxial with the axis of rotation of the drive member, said drive transmitting means comprising a drive spindle member coupled to said housing, first meshed gears coupled to said drive spindle for transmitting rotary motion to said support member, a splined member coupled to said support member for rotation about an axis extending in a direction parallel to the direction of movement of the first cross-slide member, a gear slidably mounted on said splined member for rotation therewith, a stub shaft rotatably coupled to said first cross-slide member for transmitting rotary motion therefrom, a gear in meshing engagement with said last-mentioned gear and coupled to one end of said stub shaft, second meshed gears coupled to said stub shaft for transmitting rotary motion to said second cross-slide member, a splined member coupled to said first cross-slide member for rotation about an axis extending in a direction parallel to the direction of movement of said second cross-slide member, a gear slidably mounted on said last-mentioned splined member for rotation therewith, a shaft rotatably coupled to said second cross-slide member, a gear in meshing engagement with said gear slidably mounted on said last-mentioned splined member and coupled to one end of said shaft coupled to said second cross-slide member, and means coupled to a distal end of said last-mentioned shaft for receiving a cutter therein.

3. Milling apparatus comprising a support having a rotary drive member, a milling attachment coupled to said support whereby a cutter may be moved, selectively, to positions wherein it is radially and circumferentially offset from the axis of rotation of the drive member and to positions on paths tangent to circumferential paths about the axis of rotation of the drive member, said attachment comprising rotatable means coupled to said support for rotation coaxially with the axis of said drive member, a first cross-slide member coupled to said rotatable means for movement in a direction perpendicular to the axis of rotation of said drive member a second cross-slide member coupled to said first cross-slide member for movement in a direction perpendicular to the axis of rotation of said drive member and the direction of movement of said first cross-slide member, means coupled to said second cross-slide member for rotatably supporting a cutter therefrom, and drive transmitting means coupling said means for supporting a cutter to said drive member.

4. Apparatus in accordance with claim 3, wherein said attachment comprises a housing adapted to be removably secured to said support, and a support member coupled to said housing for rotation coaxial with the axis of rotation of said drive member, said drive transmitting means comprising a drive spindle coupled to said housing, first meshed gears coupled to said drive spindle for transmitting rotary motion to said support member, a splined member coupled to said support member for rotation about an axis extending in a direction parallel to the direction of movement of said first cross-slide member, a gear slidably mounted on said splined member for rotation therewith, a stub shaft rotatably coupled to said first cross-slide member for transmitting motion therefrom, a gear in meshing engagement with said last-mentioned gear and coupled to one end of said stub shaft, second meshed gears coupled to said stub shaft for transmitting rotary motion to said second cross-slide member, a splined member coupled to said first cross-slide member for rotation about an axis extending in a direction parallel to the direction of movement of said second cross-slide member, a gear slidably mounted on said last-mentioned splined member for rotation therewith, a shaft rotatably coupled to said second cross-slide member, a gear in meshing engagement with said gear slidably mounted on the last-mentioned splined member and coupled to one end of said shaft coupled to said second cross-slide member, and means coupled to a distal end of said last-mentioned shaft for receiving a cutter therein.